Sept. 8, 1931.  J. R. HAMILTON  1,822,655
VALVE
Original Filed March 7, 1927
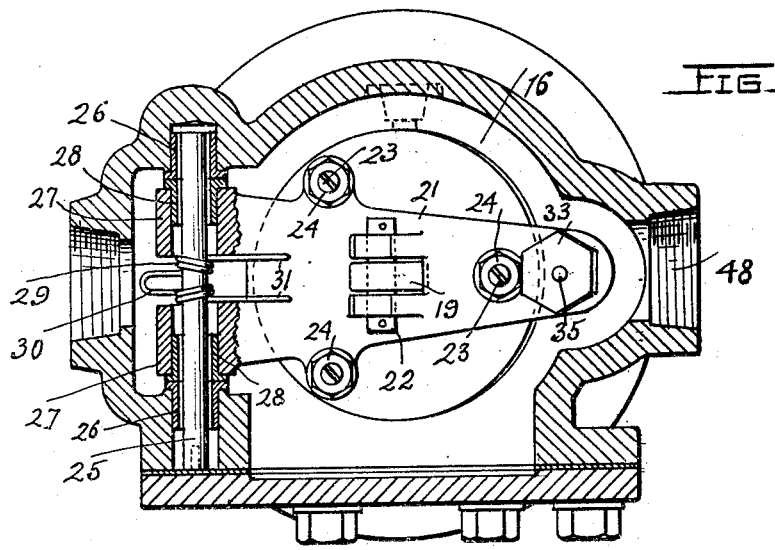
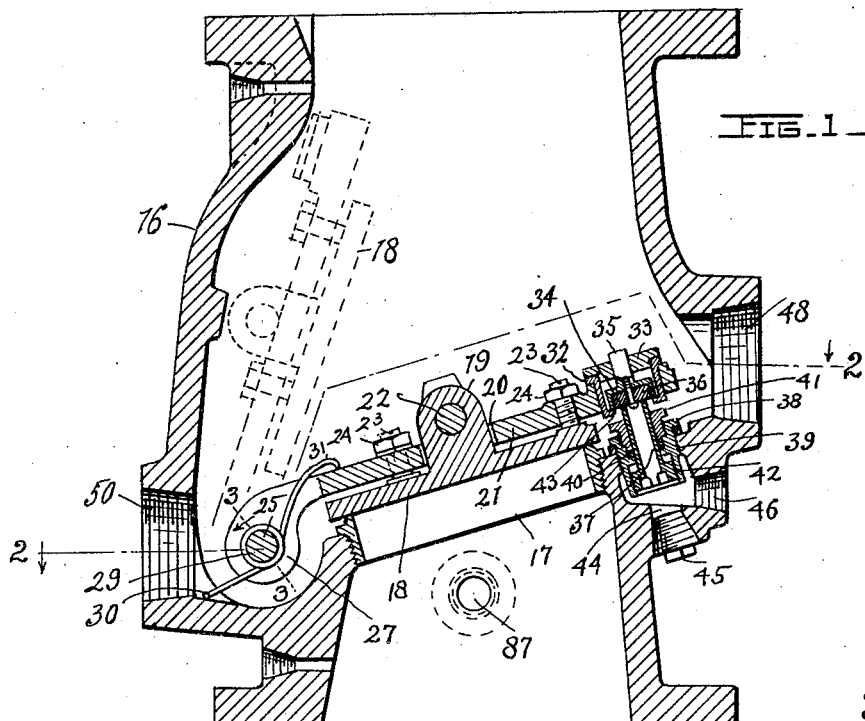
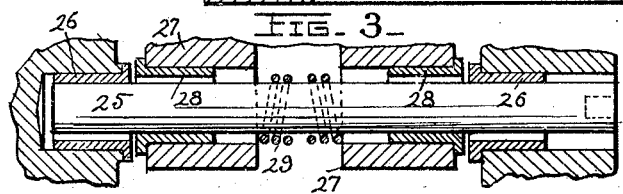
Inventor
John R. Hamilton
Kwis Hudson & Kent
Attorneys Patented Sept. 8, 1931

1,822,655

UNITED STATES PATENT OFFICE

JOHN R. HAMILTON, OF CLEVELAND, OHIO, ASSIGNOR TO AUTOMATIC SPRINKLER COMPANY OF AMERICA, OF CLEVELAND, OHIO, A CORPORATION OF DELAWARE

VALVE

Original application filed March 7, 1927, Serial No. 173,232. Divided and this application filed January 3, 1928. Serial No. 244,176.

This invention relates to valves and more particularly to water valves for sprinkler systems. The present application is a division of my earlier application Ser. No. 173,232, filed March 7th, 1927.

One of the objects of the present invention is to provide an improved form of automatically operating water valve having a pilot valve associated therewith and which will be capable of accurate adjustment to avoid objectionable lost motion in the parts, so as to insure that the opening of the pilot valve will occur upon the initial movement of the water valve.

Another object of the invention is to provide a valve mechanism, of the clapper type, in which the valve pivot is so arranged that there will be no lost motion and no liability for the valve pivot to become "frozen", due to corrosion or the deposit of sediment in the bearings thereof.

A further object of the invention is to provide a valve of the clapper type in which the valve disc is universally adjustable with respect to the arm on which it is carried, so as to insure proper registration with the valve seat.

Other objects of the invention and the features of novelty will be apparent from the following description taken in connection with the accompanying drawings, of which—

Fig. 1 is a longitudinal section through a water valve, for sprinkler systems, embodying my invention;

Fig. 2 is a transverse section on the line 2—2 of Fig. 1; and

Fig. 3 is an enlarged section on the line 3—3 of Fig. 1.

Referring to the drawings, 16 indicates the casing of an automatically opening water valve especially adapted for use in connection with automatic dry-pipe sprinkler systems. A valve seat 17 is arranged in the casing 16 and a clapper valve 18 cooperates with the seat 17. The valve 18 has a lug 19 on its upper surface which projects through an opening 20 in an arm 21, there being a pivot pin 22 for loosely connecting the lug 19 to the arm 21 so that the valve 18 may be swung on the pivot 22 for the purpose of properly aligning the valve with the seat 17. The arm 21 carries a plurality of set screws 23, preferably three in number, which are symmetrically arranged to engage the upper surface of the valve 18, on opposite sides of the pivot 22 and rigidly secure the valve to the arm 21. The set screws 23 may be locked in any position to which they are adjusted by means of the nuts 24.

The arm 21 is loosely mounted on a pivot pin 25 that is mounted in the casing 16, the ends of the pin 25 being arranged in the bushings 26 that are rigidly held in the casing, and the openings through these bushings being considerably larger than the diameter of the pin 25 so that there will be no likelihood of the pin becoming "frozen" in the bushings due to the accumulation of corrosion or other foreign substances. The arm 21 is provided with aligned ears 27 in which there are bushings 28, the internal diameter of these bushings being materially larger than the diameter of the pin 25 so that the pin will be perfectly free at all times in the bushings. A spring 29 is coiled around the middle portion of the pin 25 and has one end 30 in engagement with the inner surface of the casing 16 and the other end 31 engaging with the upper surface of the arm 21. The spring 29 is so tensioned that it holds the pin 25 in contact with the upper part of the bores of the bushings 26 (see Fig. 3). By proper adjustment of the screws 23, the arm 21 is so positioned, when the valve 18 is seated, that the lower sides of the bores of the bushings 28 are in contact with the pin 25. By this arrangement, the pin 25 is normally in eccentric relation to all of the bushings 26 and 28 and there is no lost motion between the arm 21 and the pin 25 when the valve 18 is lifted from its seat. The purpose and advantage of this arrangement will be hereinafter set forth.

A sleeve 32 is firmly secured in the upper end of the arm 21 and a cap 33 is screwed into the upper end of this sleeve. A valve 34 is loosely arranged within the sleeve 32 and has a guiding stem 35 which projects through the cap 33. The valve 34 comprises a disc 36 which cooperates with the upper end of a tubular seat member 37 that is carried by a bushing 38 which, in turn, is secured in a threaded opening 39 in the wall of the casing 16. A stuffing box is formed on the interior of the bushing 38 and comprises the packing 40 and the gland 41, so as to prevent leakage along the outer side of the seat member 37. The enlarged lower end of the seat member 37 is threaded into the bushing 38, as indicated at 42, so that the seat member may be adjusted in a vertical direction for the purpose of adjusting the valve 34. At the lower end of the sleeve 32, there is an internal lip 43 which serves to prevent the valve 34 from dropping out of the sleeve 32 when the valve 18 is opened or moved to the dotted line position shown in Fig. 1.

In line with the seat member 37, the casing 16 has an opening 44 through which a screw-driver or other tool may be inserted for the purpose of adjusting this seat member 37. The opening 44 is normally closed by a plug 45. Another opening 46 is provided in the wall of the casing 16 and a pipe may be screwed into this opening for the purpose of conducting water, which is discharged through the seat member 37, when the valve 34 is unseated, to another portion of the sprinkler apparatus, such as an alarm mechanism. For the purpose of making the valve 34 and its associated parts accessible from the exterior, there is a relatively large opening 48 in the wall of the casing 16 which may be normally closed by a plug (not shown).

For the purpose of draining the sprinkler pipe system, whenever desired, there is a threaded opening 50, in the wall of the casing 16, to which a drain pipe may be connected.

The operation of the apparatus is as follows: The water valve 18 is normally closed and when this valve is closed, the pilot valve 34 is also closed against the tubular seat member 37. It will be noted that when the valve 34 is unseated, water will be discharged through the seat member 37 from the space above the valve 18. The seat member 37 is adjusted so that the valve 34 is positioned slightly away from the lip 43, thereby permitting a slight unseating of the valve 18 without unseating the pilot valve 34. Since the parts are so arranged, as previously described, that there will be no lost motion at the pivot 25, accompanying the slight unseating movement of the valve 18, all such movements of the valve 18 will be accompanied by corresponding swinging movements of the arm 21 about the pivot 25 and, since the pilot valve 34 is located at the outer end of the arm 21, it will be unseated by any substantial unseating of the valve 18. The adjustment of the seat member 37 may be such that any slight momentary unseating of the valve 18, due to surges in pressure of the water under this valve or water hammers, will not unseat the valve 34.

Haing thus described my invention, what I claim is:

1. In apparatus of the class described, a valve casing, an arm pivotally mounted in said casing, a valve seat in said casing, a clapper valve pivotally mounted on said arm, and a plurality of screws mounted in said arm for engagement with said clapper valve to rigidly and adjustably position the latter relative to said arm and in proper relation with said seat.

2. In apparatus of the class described, a valve casing, a pivot in said casing, an arm carrying said valve and loosely fitting said pivot, and means for holding said arm in contact with said pivot so as to prevent lost-motion between the arm and the pivot during the initial opening movement of said valve.

3. In apparatus of the class described, a valve casing, a pivot in said casing, a valve arm having an aperture for said pivot that is of substantially larger diameter than the pivot, a valve carried by said arm, a seat member with which said valve cooperates, and means for adjusting said arm so that one side of said aperture will contact with said pivot, when said valve is seated, so as to avoid lost-motion between said arm and pivot during opening movements of the valve.

4. In apparatus of the class described, a valve casing, a pivot loosely mounted in said casing so as to be capable of movement transversely of the axis of the pivot, a valve seat, a valve cooperating with said seat, an arm carrying said valve and attached to said pivot, and means so positioning said pivot in said casing that the pivot will be without lost-motion in the direction of the initial opening movement of said valve.

5. In apparatus of the class described, a valve casing, a pivot loosely mounted in said casing so as to be capable of movement transversely of the axis of the pivot, a valve seat, a valve cooperatitng with said seat, an arm carrying said valve and attached to said pivot, and spring means engaging said casing and cooperating with said pivot to so position the pivot that it will be without lost-motion in the direction of the initial opening movement of said valve.

6. In apparatus of the class described, a valve casing, a pivot loosely mounted in said casing so as to be capable of movement transversely of the axis of the pivot, a valve seat, a valve cooperating with said seat, an arm carrying said valve and attached to said pivot, and means for adjusting said valve relative to said arm so as to take up lost-motion between said pivot and said casing in the direction of the initial opening movement of said valve.

7. In apparatus of the class described, a valve casing, a pivot loosely mounted in said casing so as to be capable of movement transversely of the axis of the pivot, a valve seat, a valve cooperating with said seat, an arm carrying said valve and attached to said pivot, and a spring coiled about said pivot and having one end engaging said casing and its other end engaging said arm to so hold said pivot in engagement with said casing as to avoid lost-motion between said pivot and the casing in the direction of the initial opening movement of the valve.

In testimony whereof, I hereunto affix my signature.

JOHN R. HAMILTON.